(12) United States Patent
Ghannam

(10) Patent No.: US 10,079,790 B2
(45) Date of Patent: Sep. 18, 2018

(54) METHOD FOR CONTROLLED SHARING OF CONTENT AMONG MOBILE DEVICES

(71) Applicant: Fozan Ghannam, Alexandria, VA (US)

(72) Inventor: Fozan Ghannam, Alexandria, VA (US)

( * ) Notice: Subject to any disclaimer, the term of this patent is extended or adjusted under 35 U.S.C. 154(b) by 126 days.

(21) Appl. No.: 14/999,651

(22) Filed: Jun. 10, 2016

(65) Prior Publication Data

US 2017/0359286 A1    Dec. 14, 2017

(51) Int. Cl.
   *G06F 15/16* (2006.01)
   *H04L 12/58* (2006.01)
   *H04L 12/18* (2006.01)

(52) U.S. Cl.
   CPC .......... *H04L 51/10* (2013.01); *H04L 12/1818* (2013.01); *H04L 12/1822* (2013.01); *H04L 51/38* (2013.01)

(58) Field of Classification Search
   CPC ............................. H04L 51/10; H04L 12/1818
   USPC .................................................. 709/204, 206
   See application file for complete search history.

(56) References Cited

U.S. PATENT DOCUMENTS

| 2006/0174203 A1* | 8/2006 | Jung | G06F 17/3028 715/751 |
| 2008/0019569 A1* | 1/2008 | Rhoads | G06F 3/017 382/107 |
| 2014/0286526 A1* | 9/2014 | Wang | G06F 17/3028 382/100 |

* cited by examiner

*Primary Examiner* — Wing F Chan
*Assistant Examiner* — Andrew Woo

(57) ABSTRACT

A digital content sharing and control method using a relay transceiver (i.e., a relay server), a byte constructor and a packaged byte strips is provided. A media file is stripped and packaged from the primary mobile device via object processor and packaging manager to be relayed to the secondary mobile device. A method for sharing pictures and media content that includes accessing images from a first primary mobile device and an ability to push and pullback images to and from a secondary mobile device is provided. A first mobile device has an ability to control the media content sent to the secondary mobile device. The primary mobile device has a control over content push forward and pullback operations performed in real time to and from a secondary mobile device.

13 Claims, 9 Drawing Sheets

METHOD FOR CONTROLLED SHARING OF CONTENT AMONG MOBILE DEVICES

BACKGROUND OF THE INVENTION

Field of the Invention

This invention relates to a digital content sharing and, in particular, to a method for sharing media files among mobile devices.

Description of the Related Art

Internet-based messaging platforms have increased in popularity and use in recent years. That class of services often features a real-time messaging channel in which users may mutually view typed messages in real-time. However, commercially available messaging services have not integrated the sharing of image media as a layer or enhancement on top of the typed or other message exchange.

More specifically, the steady proliferation of digital imaging devices such as camera-equipped cellular phones and personal digital assistants has made the sharing of digital images and other media more and more common online activity. However, messaging users who would like to exchange, share and download images from either side of a conversation have not been able to freely incorporate picture exchange in real-time within their communication experience, and certainly not as a part of an integrated messaging tool. Other problems and disadvantages exist in messaging technology as well.

Real-time manipulation tools allow users to manipulate and control media in real-time. The real-time manipulations can include dictation of audio, video, images, objects on screen, any combination of the aforementioned, etc. The real-time manipulation tools are available as stand-alone applications that can be installed on devices or as web browser-based applications. However, the current real-time manipulation tools do not provide efficient ways to retract media and/or objects, for example, a user interface container filled with data that has been transmitted. Further they lack the ability to retract transmissions after being started, or while in the process of sending media as well as stopping a transmission at any given time during a given transmission. They also lack near nonexistent latency, adaptability, and efficiency in scaling for a larger network of connected peers.

Accordingly, a method for efficient media sharing among mobile devices is desired.

SUMMARY OF THE INVENTION

This invention relates to a digital content sharing and, in particular, to a method for sharing media files among mobile devices that substantially overcomes one or more disadvantages of the related art.

The present invention is directed to a method for allowing a primary mobile device (i.e., a sender) an exclusive ability to push forward and pull back content in real-time, in particular to control the amount of content being viewed by the secondary device (i.e. a receiver), by handling the bytes of the selected media through a series of processors, transmitters and transceivers. An exemplary embodiment includes a combination of remote devices backed by a server that acts as a central relay station using software designed for the sole purpose of monitoring and handling user requests regarding bytes and commands to target specific devices.

A system and related methods allowing a group of two or more users to initiate a messaging session to communicate multimedia in real-time, and send invitation to more participants to transmit and share multimedia such as images and other media to a display tool seen by all participants. The messaging session can be conducted via a message server, which mediates the exchange of messages back and forth amongst participants. One or more users may assume control of the commonly displayed images. Users can discuss the displayed images or other media in real-time. The participants may each view or otherwise use or manipulate the copy of the image or images as presented to them only when the first user grants a permission to other participant to manipulate the shared content. Session control of the set of displayed images may be passed from one user to another on a voluntary basis, using for example a control token or other mechanism. In one embodiment, a shared control can be used. According to an exemplary embodiment, an out-of-order rendering and other optimizations can enhance the response time to participating viewers.

According to yet another aspect of the present invention, a computer-readable medium is provided containing computer-executable instructions for performing media content sharing with an apparatus connected to a second apparatus and configured to slide (or share) an image between a plurality of client terminals via a network. The computer readable medium includes computer-executable instructions for setting a transmission processing mode for transmitting a still image and a real-time image to the plurality of client terminals; and computer-executable instructions for controlling the sharing of the media content apparatus and a sliding of the image in real-time.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present invention is directed to a method for sharing media files among mobile devices. A method for sharing pictures and media content that includes accessing images from a first primary mobile device and an ability to push and pullback images to and from a secondary mobile device is provided. A first mobile device has an ability to control the media content sent to the secondary mobile device. The primary mobile device has a control over content push forward and pullback operations performed in real time to and from a secondary mobile device.

The present invention relates to a digital content sharing method and a non-transitory machine readable media thereof, and more particularly, to a digital content control sharing method using a relay transceiver (i.e., a relay server), a byte constructor and packaged byte strips. A media file is stripped and packaged from the first primary device via object processor and packaging manager to be relayed to the secondary mobile device.

Figure 1:
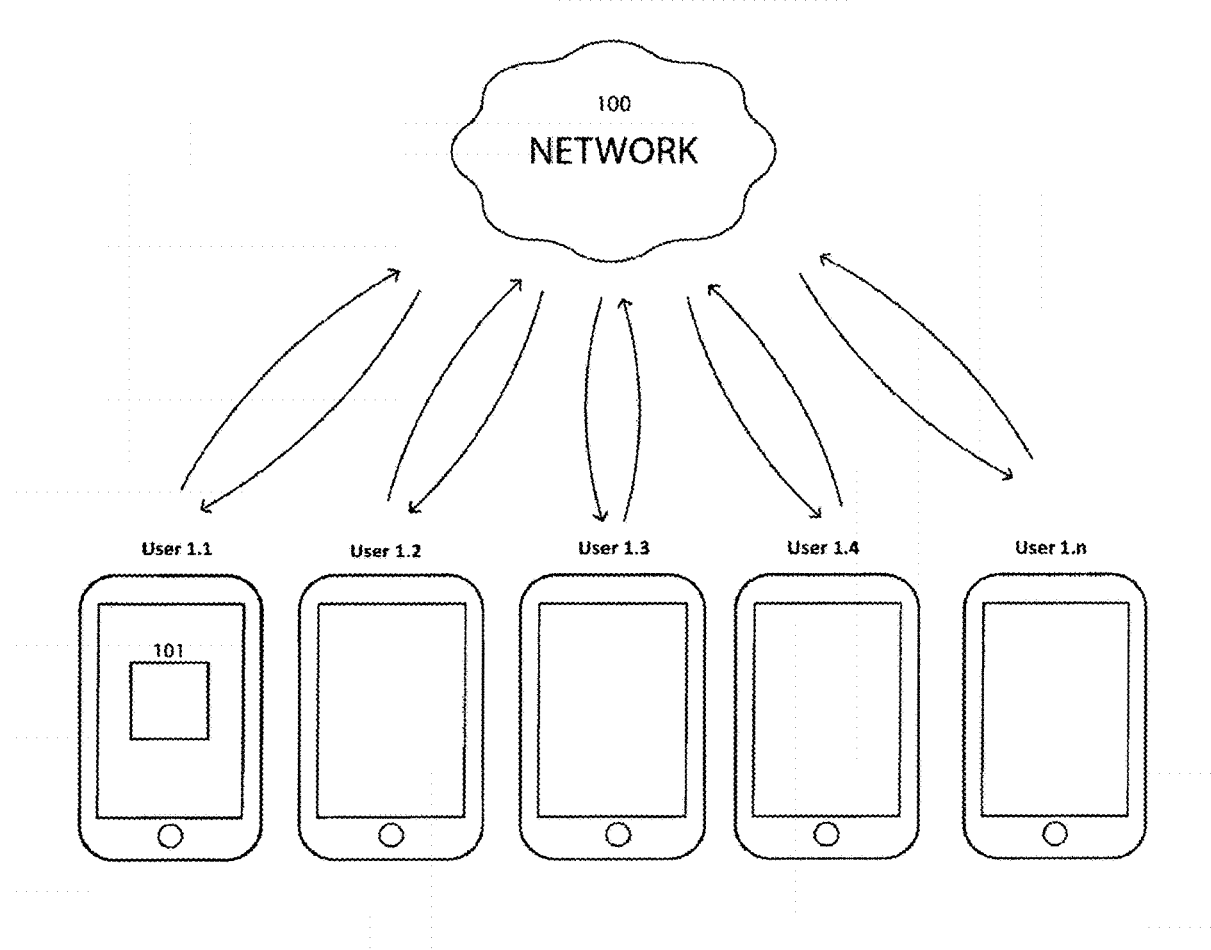
FIG. 1 illustrates a basic network including multiple user devices in communication with each other, in accordance with the exemplary embodiment.

FIG. 1 illustrates a basic network including multiple user devices in communication with each other, in accordance with the exemplary embodiment. FIG. 1 illustrates a diagram of interaction between multiple devices 1.1, 1.2 . . . 1.N illustrating the ideal exchange of media, consistent with the embodiments in the divulged technology. The exchange includes multiple aspects that run concurrently in computer network such as Wireless Local Area Network (WLAN), Wi-Fi, Local Area Network (LAN), Cellular Network, GSM or any IEEE 802.11 capable device. For example, user 1.1 accesses a storage medium of the user device. The data in storage medium 101, is handed to 1.N, which is handled through the network 100 from a relay server or from a storage medium and then received at device 1.N.

As further shown in FIG. 1, an image is being shared between a first device 1.1 and second device 1.2, while the first user of the first device shares an image in real-time, a second user of the second device receives exactly as much as the first user is sharing by sliding the image back and forth in real-time. The image is stored in a media library which the user can browse through may, for example, be on the first device 1.1.

Examples of storage device as an example of the recording medium, a portable recording medium, such as a CD-ROM, a DVD disc, a USB memory, or a flash memory, etc., are given. The recording medium corresponds to a non-transitory computer-readable recording media. Hundreds or even thousands of media files that include pictures, videos, audio files, documents and/or media playlist can be shared. Accordingly, while the user may browse the media library using the first primary mobile device, the media files themselves may be stored on the first device. Thus, in some implementations, metadata about some or all of the media files is stored locally on the mobile computing device with the corresponding user profiles stored at a server system further explained in FIG. 2. For example, media content that is included in a media library for a user of the first primary mobile device may be stored in a media storage that is accessible from the server system.

Similarly, the media storage may include media content that is included in a media library associated with the mobile computing device. The primary first mobile computing device 1.1 may communicate with a second mobile computing device 1.2, For example, the first device could be a personal computer that may be the home computer for a user of the mobile computing device 1.1. Thus, the user may be able to receive media from another personal computer. The user may also view the file structure of his personal computer, and push and pull-back real time view ability control of the media content with the computerized devices.

Figure 2:
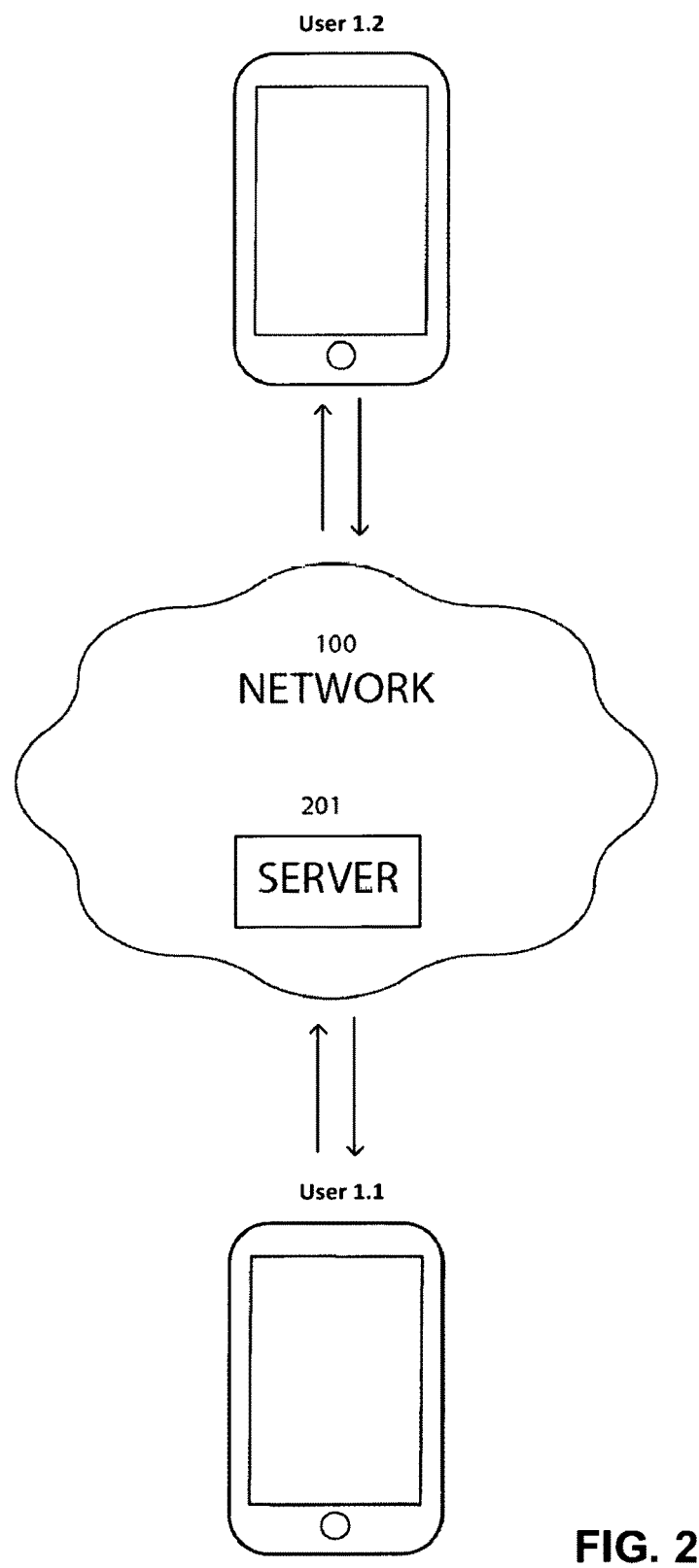
FIG. 2 illustrates the basic network including multiple user devices in communication with each other through an intermediate server.

FIG. 2 illustrates the basic network including multiple user devices in communication with each other through an intermediate server. A server 201 is used as a container to manage the data across multiple devices. The server 201 is the primary device with the main container and where the interactions of the media file is initialized after it is uploaded. In order for the user 1.1 to begin sending media content to user 1.2 over a network 100, the user 1.1 will have to first create a stored friend connection in the server 201 by searching through the stored profiles present on the server 201. The user 1.1 can look up the user 1.2 using a username, a contact list, an email, a location, an age, or a phone number. The location determination unit may be, for example, a GPS (Global Positioning System) unit. Other examples include the location determination units using cell-tower triangulation, near field communication (NFC), Bluetooth communication, or QR (Quick Response) code scanned by device visually exposed to another device.

The contact list search mechanism imports the locally stored contacts, scans the list and creates a contact package for each contact, presents the list to the user and waits for the user to select a contact. Once the user has selected a contact, the contact package is then sent to the server. The server takes the contact package and tries to find any or as many similarities with stored profiles in the database, and the closest match would then be returned first. This allows for any user to simply select a contact from their contact list and allow the service to take care of the rest. This is amongst the richest forms of search, with the most likeliness of returning closely matched results.

Searching using an age range, goes from a simple action of typing in an age and returning users that are of that age, to selecting an age range, for example, selecting all users that are between the ages of 25-30 and displaying them in the order of lowest to highest as their primary sort, and alphabetically as their secondary sort order. Using a phone number as the search query, typing a phone number would first look into the local phonebook to try to find a match and if it finds a match, it takes that match and sees if this person exists in the stored profiles in the server. If no local match is found, the phone number is sent directly to the server to check if the number is registered with the specific profile.

Once user 1.1 finds user 1.2 on the network 100, the user 1.1 sends a friend request (which is temporarily stored on the server 201) to user 1.2. The user 1.2 gets a push notification regarding the friend request. The user 1.2 can either accept or deny the friend request. If the user 1.2 were to deny the friend request, then all records would be permanently discarded and the user 1.1 would need to repeat the process. If the user 1.2 accepts the request, the network 100 stores that connection into a permanent storage. This connection allows the user 1.1 and the user 1.2 to begin a session, where sending of media content would be exclusive to those participating in the private session.

Figure 3:
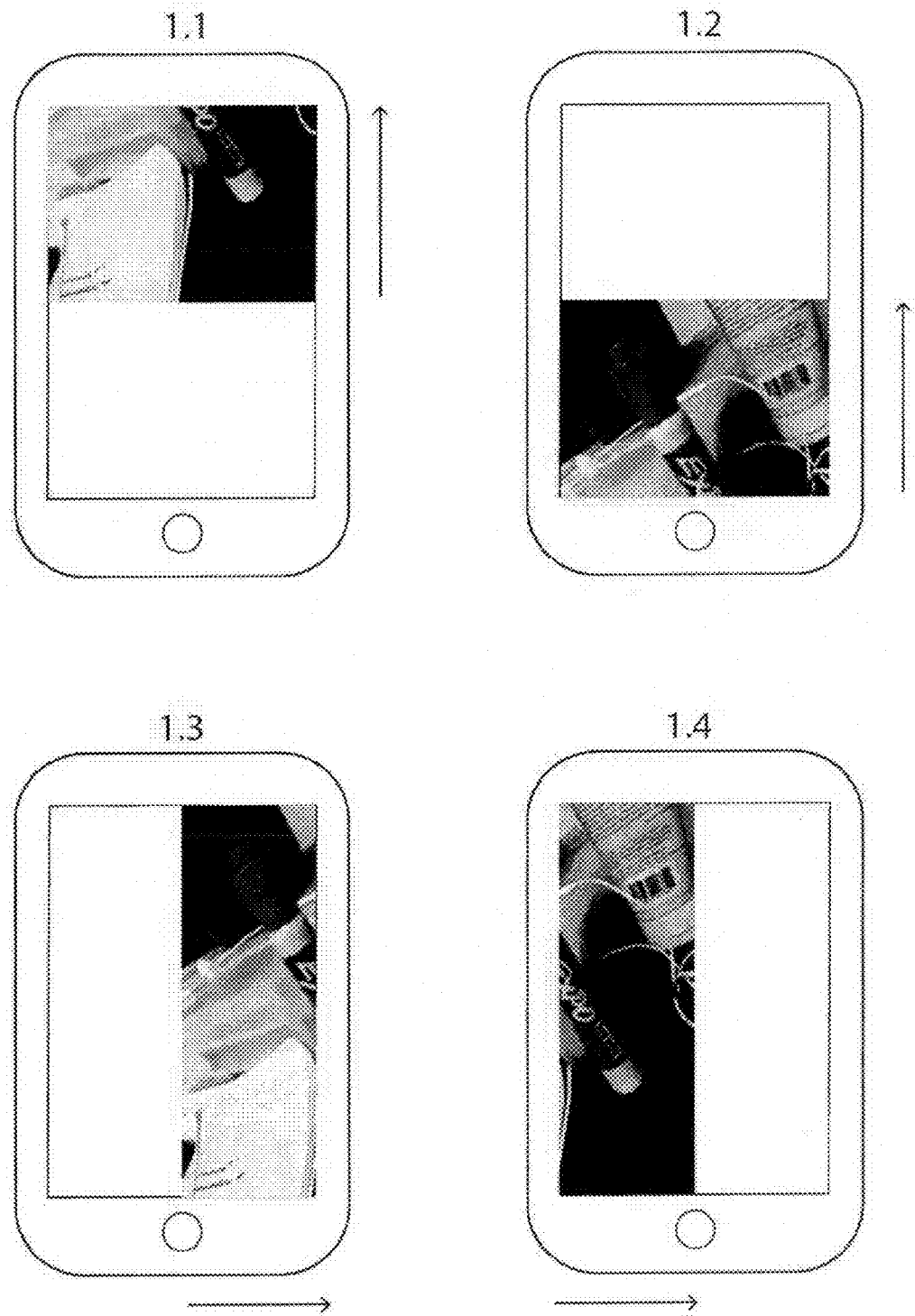
FIGS. 3A and 3B illustrate how a portion of an image is shown on the second device by sliding the image by a first user on first mobile device, in accordance with the exemplary embodiment.

FIGS. 3A and 3B illustrate how a portion of an image is shown on the second device by sliding the image by a first user on first mobile device, in accordance with the exemplary embodiment. The storage media 101 (see FIG. 1) is loaded with a selected media and begins to push and pull the media file up and down or sideways. Once a session is started between the user 1.1 and the user 1.N, the user 1.1 selects the media file from the storage media 101 or directly takes a picture using either of the present cameras and starts transmitting the media using a touch control to push up the media file and control the view-ability of the media file on the secondary device.

As illustrated in FIGS. 3A and 3B, the user 1.1 has the ability to share a media file by sliding the file back and forth to share as much as the first user wishes. The first user could show the entire media file, but will be able to pull the media file back and away from the second user even after the second user viewed the media file in order to keep complete control of the shared portion of the media file.

Once the second user receives the entire media file, the second user does not have an option to store the media or even take a snap shot of the media file. Thus the first user (i.e., a sender) remains in control of the shared media file. While the first user and the second user are in a communication session, both users are capable of sending textual messages to each other. While any of the users is typing, the other user is able to see what is being typed in real-time without even sending the textual message. The users have the option to type in real-time, delete the textual messages in real-time and send the message without the option of storing the communication session on the second user device. Thus, when the communication session is ended, the data exchanged between the devices is not stored on the receiving end and cannot be traced or restored.

When an image is selected, the interface sending algorithm (i.e., a "Forwarder") scans the selected media from the top down. The Forwarder then converts the media into a percentage, this percentage makes it easier to keep track of how much of the media the user wants to share and retrieve, preventing the user from using hard coded numbers making it flexible for different sizes of media. The scan process is implemented as follows:

breaking down the file to the byte level; and
counting the amount of bytes found and grouping them by the collection they belong to, wherein a collection represents how many bytes there are in a single row. Once the image has been scanned, the Forwarder sends a copy of the file's information (mainly the details regarding the amount of bytes) to the relay station (i.e., a server).

The amount of bytes is essential number used as a reference while sending and receiving data in real time.

When the file has been scanned and the user begins to push the media out of bounds, the percentage of the file that is outside is sent out in packages of grouped bytes to the relay station with an ID, Target User_ID, Sending_User_ID, Direction(X or Y) and Date (none of which are stored anywhere) attached to the package. When this package is received by the relay station server, the relay station reads the Target_User_ID only and sends the package to that ID. Once the targeted user receives that package, the package is reconstructed and displayed in the correct side of the screen.

A non-transitory computer readable medium refers to a medium which stores data semi-permanently and is readable by a device, not a medium which stores data for a brief time such as a register, a cache, and a memory. To be specific, the aforementioned various applications or programs may be provided by being stored in a non-transitory computer readable medium such as a CD, a DVD, a hard disk, a Blu-ray disk, a USB, a memory card, and a ROM, etc.

Figure 4:
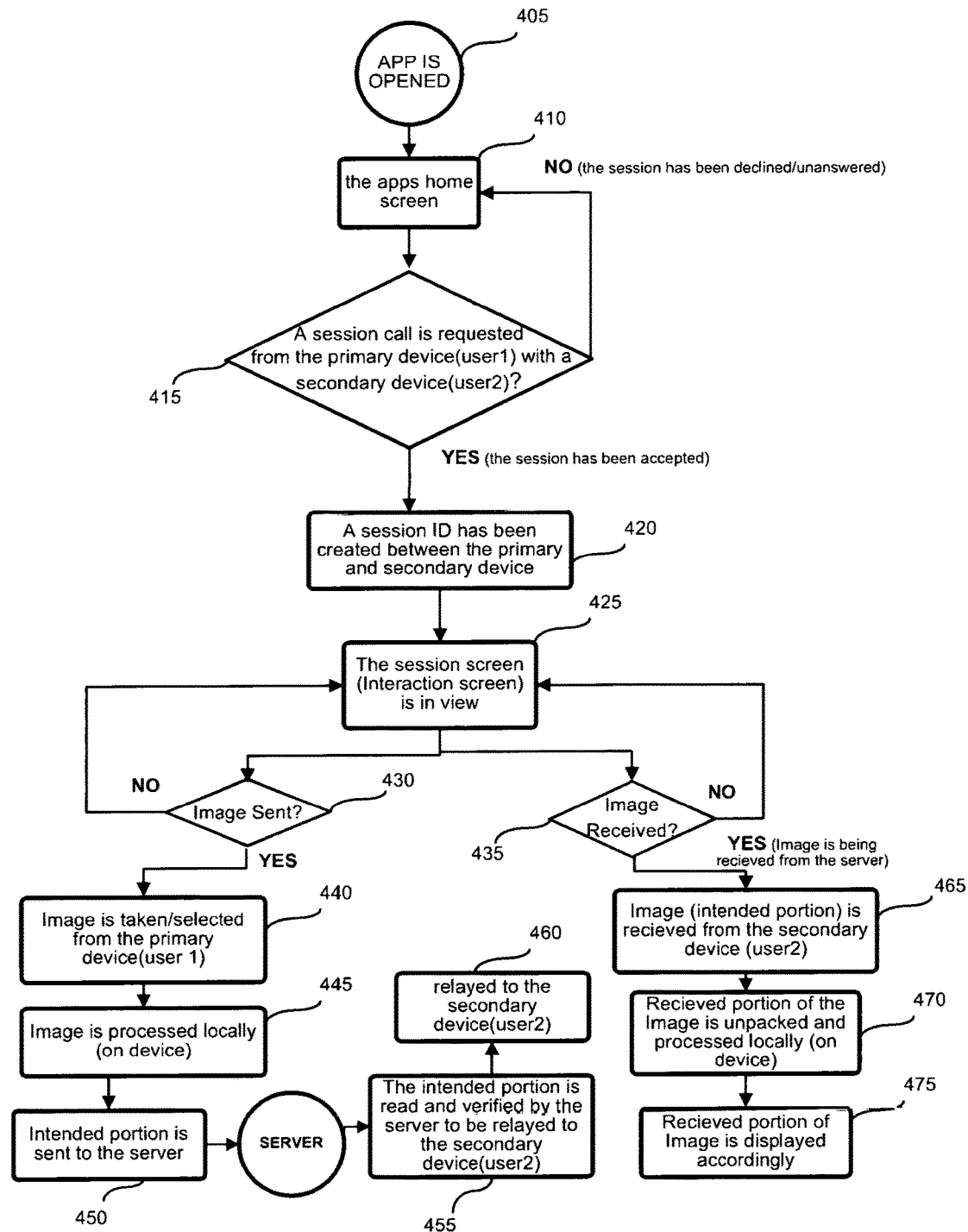
FIG. 4 illustrates a flowchart of an image sharing process among a primary and a secondary mobile device, in accordance with the exemplary embodiment.

FIG. 4 illustrates a flowchart of an image sharing process among a primary and a secondary mobile device, in accordance with the exemplary embodiment. An image sharing application is launched in step 405. The application home screen is displayed in step 410. If a session call is requested from the primary device (user 1) with a secondary device (user 2) in step 415, a session ID is created between the primary and the secondary devices in step 420. Otherwise, the process returns to step 410 since the session has been declined. The session screen is displayed in step 425.

If, in step 430, the image is to be sent, the image is selected from the primary device in step 440. Otherwise, no image is selected to be sent to the secondary device and the process returns to step 425. The image is processed locally on the primary device in step 445 and the intended portion is sent to the server in step 450. Then, the intended portion is read and verified by the server to be relayed to the secondary device in step 455. The content is relayed to the secondary device in step 460. If, in step 435, the image is to be received from the server the image intended portion is received from the secondary device (user 2) in step 465. In step 470, the received portion of the image is unpacked and processed locally on the device. The received portion of the image is displayed accordingly in step 475.

Figure 5:
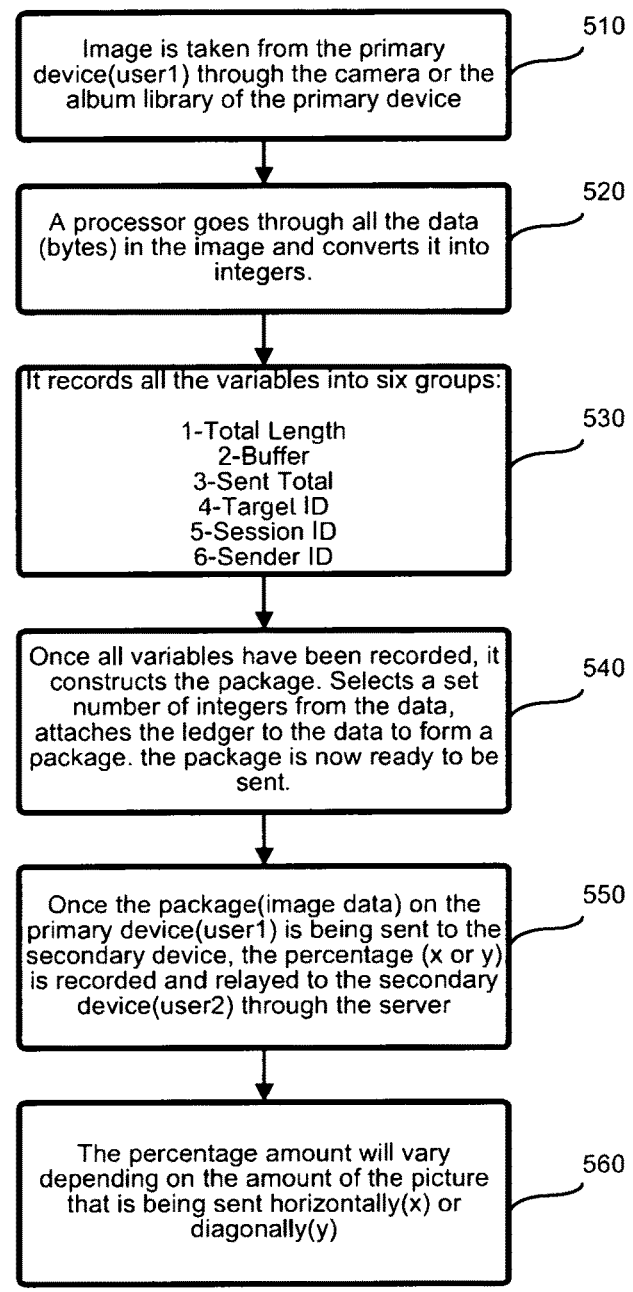
FIG. 5 illustrates a flowchart demonstrating how a primary mobile device takes an image data and converts it into a package to be sent to a server for relaying it to a secondary mobile device, in accordance with the exemplary embodiment.

FIG. 5 illustrates a flowchart demonstrating how a primary mobile device takes an image data and converts it into a package to be sent to a server for relaying it to a secondary mobile device, in accordance with the exemplary embodiment. The flowchart illustrates a process that takes place on the user mobile device. In step 510, the image is taken by the primary device using a camera or from an image library. The processor goes through the image byte data and converts it into integers in step 520. The variables are recorded into six groups in step 530: total length, buffer, sent total, target ID, session ID and sender ID.

In step 540, once all variables are recorded, the package is constructed. The process selects a set number of integers from the data, attaches the ledger to the data to form a package to be sent. In step 550, once the package (image data) on the primary device (user1) is being sent to the secondary device, the percentage (X or Y) is recorded and relayed to the secondary device (user2) through the server. In step 560, the percentage amount varies depending on the amount of the image being sent horizontally (X) or diagonally (Y).

Figure 6:
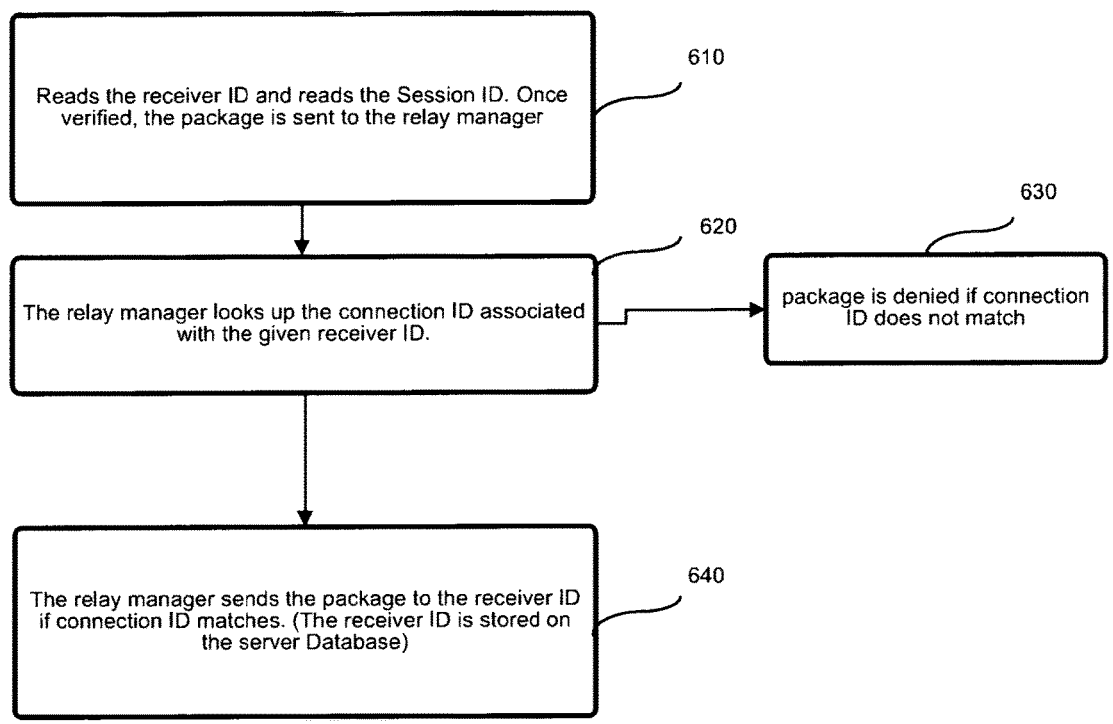
FIG. 6 illustrates a flowchart demonstrating how a server receives a package, verifies it and relays it to the secondary mobile device, in accordance with the exemplary embodiment.

FIG. 6 illustrates a flowchart demonstrating how a server receives a package, verifies it and relays it to the secondary mobile device, in accordance with the exemplary embodiment. In step 610, the server reads the receiver ID and the session ID. Once verified, the package is sent to a relay manager. The relay manager looks up the connection ID associated with the given receiver ID in step 620. The package is denied if the connection ID does not match in step 630. In step 640, the relay manager sends the package to the receiver with the ID, if connection ID matches. Note that the receiver ID is stored on the server database.

Note that the server does not modify anything. Connection ID is randomly generated. According to the exemplary embodiment, the one-time created secure ID is given to a user (device) as an identifier on the network. The user ID is used to identify the account, the connection ID is used to identify the physical device. A new connection ID is generated every time a user is connected (i.e., logged in) to the server. Once the user is disconnected (i.e., logged off) the connection ID gets discarded.

Figure 7:
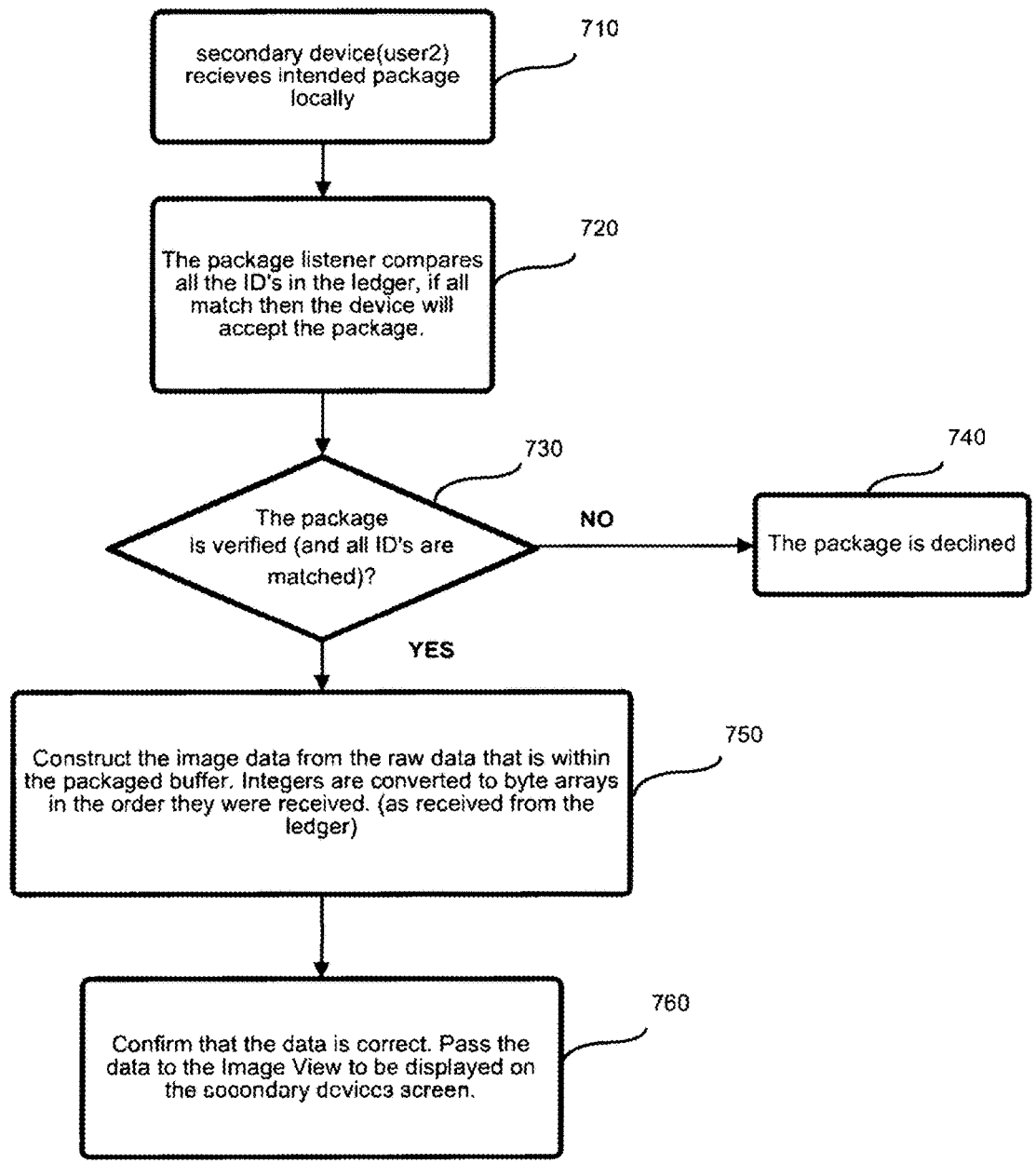
FIG. 7 illustrates a flowchart demonstrating how a secondary mobile device receives a package, unpacks it and constructs an image to be rendered on the secondary mobile device screen, in accordance with the exemplary embodiment.

FIG. 7 illustrates a flowchart demonstrating how a secondary mobile device receives a package, unpacks it and constructs an image to be rendered on the secondary mobile device screen, in accordance with the exemplary embodiment. In step 710, a secondary device (user 2) receives an intended package locally. In step 720, a package listener compares all the IDs in the ledger. If all of the IDs match, the device accepts the package. If the package is verified in step 730, the process constructs the image data from the raw data from the packaged buffer in step 750. Integers are converted to byte arrays in order they were received from the ledger. Otherwise, the package is declined in step 740. Then, in step 760, the process confirms that the data is correct and passes the data to the Image View to be displayed on the secondary devices screen.

Figure 8:
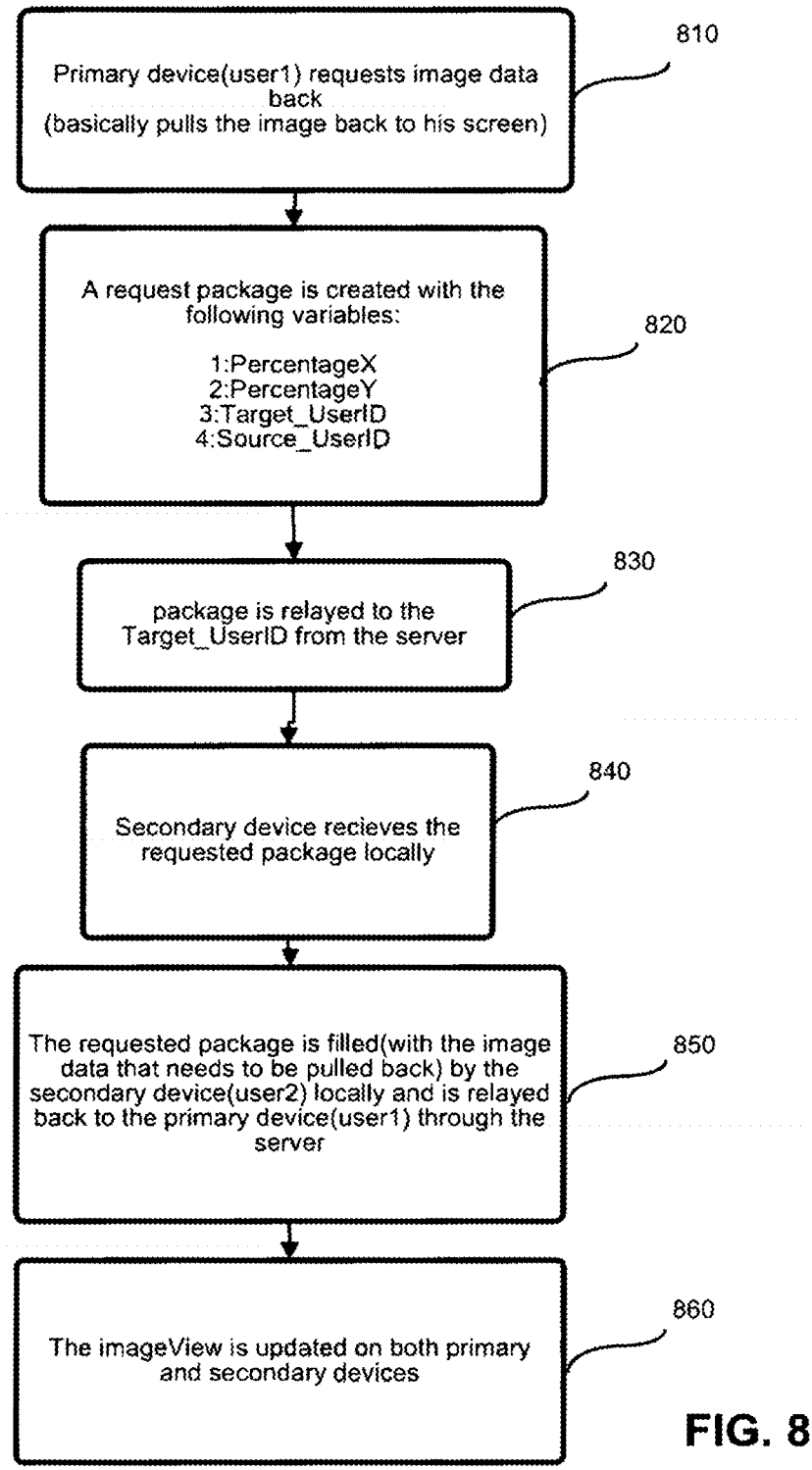
FIG. 8 illustrates a flowchart demonstrating how an image data gets pulled back from the secondary device to the primary device, in accordance with the exemplary embodiment.

FIG. 8 illustrates a flowchart demonstrating how an image data gets pulled back from the secondary device to the primary device, in accordance with the exemplary embodiment. This flow chart illustrates a mechanism that allows for a primary user to have a complete control over what the secondary user sees on his screen. In step 810, a primary device (user 1) requests image data back—i.e., pulls the image to his screen. In step 820, a request package is created with the following variables:

1:PercentageX
2:PercentageY
3:Target_UserID
4:Source_UserID

In step 830, a package is relayed to the Target_UserID from the server. In step 840, a secondary device receives the requested package locally. In step 850, the requested package is filled (with the image data that needs to be pulled back) by the secondary device (user2) locally and is relayed back to the primary device (user1) through the server. Then, in step 860, the ImageView (screen) is updated on both primary and secondary devices.

Note that the server has no idea what it is relaying. The data is relayed in an integer form and the server only follows a set number of instructions. The instructions are as follows:

1) Read a package;
2) Read a receiver ID;
3) Verify a session ID;
3.1) Verify that the receiver ID and sender ID are tied to the session ID; and
4) Send the package to the receivers ID connection ID.

According to the exemplary embodiment, only primitive's data is exchanged—i.e., Integers and alphabetical symbol objects. In one embodiment the image data can be encrypted on the primary device and decrypted on the secondary device. Any time of private key or public key encryption can be used. In one embodiment, the image or media data can be compressed on the primary device and decompressed on the secondary device. Encryption and compression can also be implemented on the secondary device when the data is requested to be pulled back.

According to the exemplary embodiment, users are tied to a UserID created and stored at a sign up. This UserID can never be changed. The images can only be obtained from a device (user) that wants to send it. The image chunks that are relayed back and forth are indentified by the combination of the two user IDs and a session ID. Note that the proposed system is not an online storage for images. The server does not keep any image data—it only relays it between the devices (users).

According to the exemplary embodiment, the image data is converted into a linear list of integers that either are read from top-down or bottom-up. For speed and efficiency the system converts and works out of a percentage (a size of an image chunk).

Figure 9:
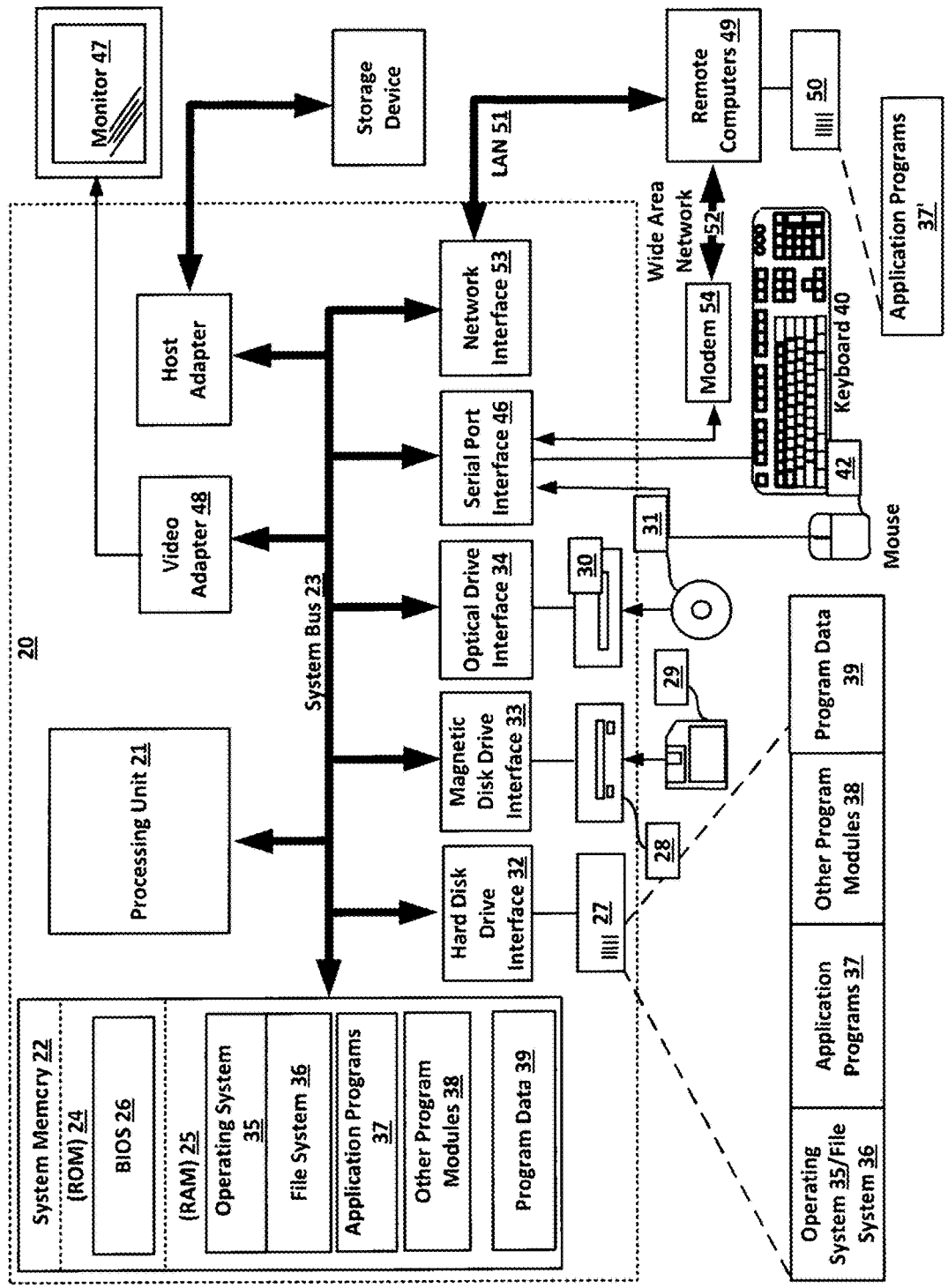
FIG. 9 illustrates an exemplary computer system or server, which can be used for implementing the invention.

With reference to FIG. 9, an exemplary system for implementing the invention includes a general purpose computing device in the form of a computer system or a server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. Iii a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A computer-implemented method for controlled sharing of image data among mobile device, the method comprising:
    sending a session initiation request from a primary mobile device to a secondary mobile device;
    establishing a connection between the primary mobile device and the secondary mobile device via a relay server by generating a session identification (ID);
    acquiring an image to be pushed from the primary mobile device to the secondary mobile device;
    determining a portion of the image to be pushed by assigning a size percentage to the image;
    processing the portion of the image;
    compressing the image portion on the primary mobile device;
    constructing a package from the processed image portion;
    pushing the package to the relay server to be relayed to the secondary mobile device;
    sending a pullback request to the relay server to pull back the portion of the image;
    retracting the portion of the image from the relay server;
    decompressing the retracted portion of the image on the primary mobile device;
    updating an image view window on the primary mobile device upon the retraction of the portion image from the secondary mobile device; and
    pushing and retracting an entire image originated on the primary mobile device,
    wherein the portion of the image is controlled by the primary mobile device and cannot be saved on the relay server and on the secondary mobile device.

2. The method of claim 1, further comprising defining the size percentage of the image by a percentage X and a percentage Y, wherein the percentage X reflects a horizontal size of the image portion and the percentage Y reflects a diagonal size of the image portion.

3. The method of claim 1, further comprising taking the image from library residing on the primary mobile device.

4. The method of claim 1, further comprising acquiring the image from a primary mobile device integrated camera.

5. The method of claim 1, further comprising processing the image portion by converting data byte of the image into integers.

6. The method of claim 5, further constructing the package from the processed image portion by including any of variables into a package:
    a total length;
    a buffer;
    a sent total;
    a target ID;
    the session ID; and
    a sender ID.

7. The method of claim 6, wherein the variables are attached to the package as a ledger.

8. The method of claim 1, wherein the pull back request includes any of:
    a percentage X;
    a percentage Y;
    a target user ID; and
    a source user ID.

9. The method of claim 1, further comprising encrypting the package on the primary mobile device prior to pushing the package to the relay server and decrypting the retracted package upon receiving the package from the relay server.

10. The method of claim 1, further comprising reconstructing the image portion from a retracted package by converting integers into byte arrays in order they are received within a package buffer.

11. The method of claim 1, further comprising encrypting the package on the primary mobile device.

12. The method of claim 1, further comprising exchanging text messages between the primary mobile device and the secondary mobile device prior to sharing the image portion.

13. A mobile computing system comprising:
    a processor;
    a memory on which are stored machine readable instructions that when executed by the processor, cause the processor to:
        send a session initiation request to a receiver mobile device;
        establish a connection with the receiver mobile device via a relay server by generating a session identification (ID);
        acquire an image to be pushed from the mobile computing system to the receiver mobile device;
        determine a portion of the image to be pushed by assigning a size percentage to the image;
        process the portion of the image;
        compress the portion of the image;

construct a package from the processed image portion;
push the package to the relay server to be relayed to the receiver mobile device;
send a pullback request to the relay server to pull back the portion of the image; and
retract the portion of the image from the relay server;
decompress the retracted portion of the image;
updating an image view window on the primary mobile device upon the retraction of the portion image from the secondary mobile device; and
pushing and retracting an entire image originated on the primary mobile device,
wherein the portion of the image is controlled by the mobile computing system and cannot be saved on the relay server and on the receiver mobile device.

* * * * *